United States Patent [19]

Nast et al.

[11] 3,864,307

[45] Feb. 4, 1975

[54] NATURAL AND SYNTHETIC DIENE POLYMERS STABILIZED WITH CRESOL DERIVATIVE ANTIOXIDANTS

[75] Inventors: Roland Nast, Dormagen-Hackenbroich; Wolfgang Redetzky, Opladen-Quettingen; Gustav Sinn, Bergisch Neukirche; Theo Kempermann; Joseph Witte, both of Cologne; Günter Marwede, Leverkusen, all of Germany

[73] Assignee: Bayer Aktiengesellschaft, Leverkusen, Germany

[22] Filed: July 10, 1973

[21] Appl. No.: 378,015

Related U.S. Application Data

[62] Division of Ser. No. 100,362, Dec. 21, 1970, abandoned.

[30] Foreign Application Priority Data

Jan. 3, 1970 Germany.............................. 2000180

[52] U.S. Cl............................ 260/45.95 H, 260/799

[51] Int. Cl.......................... C08c 7/10, C08d 11/04
[58] Field of Search............. 260/45.95 H, 801, 799

[56] References Cited
UNITED STATES PATENTS

| | | | |
|---|---|---|---|
| 2,537,636 | 1/1951 | Kitchen............................ | 260/45.95 |
| 2,839,493 | 6/1958 | Lambert et al.................. | 260/45.95 |
| 2,952,662 | 9/1960 | Wald................................ | 260/45.95 |
| 2,953,542 | 9/1960 | Stark et al. ..................... | 260/45.95 |
| 3,036,138 | 5/1962 | Mingasson et al.............. | 260/45.95 |
| 3,180,850 | 4/1965 | van Schooten et al. ........ | 260/45.95 |
| 3,357,948 | 12/1967 | Stockmann et al............. | 260/45.95 |

*Primary Examiner*—Melvyn I. Marquis
*Assistant Examiner*—Eugene C. Rzucidlo
*Attorney, Agent, or Firm*—Connolly and Hutz

[57] ABSTRACT

The invention disclosed herein relates to the stabilization of natural and synthetic diene polymers with cresol derivatives such a 2-tert. butyl-4-methyl-6-cyclopentyl-phenol, and 2-ter. butyl-4-methyl-6-indanyl phenol.

6 Claims, No Drawings

NATURAL AND SYNTHETIC DIENE POLYMERS STABILIZED WITH CRESOL DERIVATIVE ANTIOXIDANTS

This invention relates to novel compounds corresponding to the general formula:

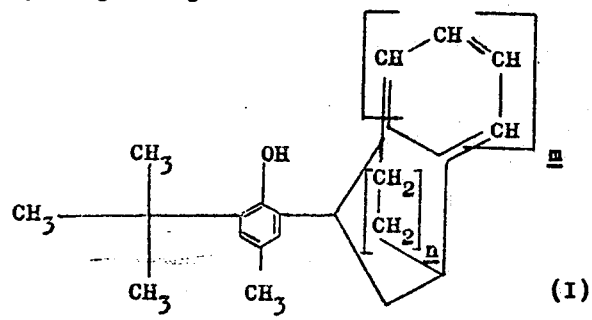

in which $m$ and $n$ are 0 or 1 but cannot at the same time both be 1, to a process for their production and to their use for protecting natural and synthetic diene polymers against degradation through oxidation.

Accordingly, the right-hand radical in formula (I) represents the cyclopentyl radical,

the indenyl radical

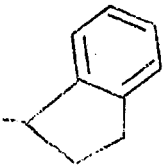

or the norbornyl radical

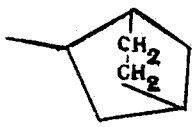

2-tert.-butyl-4-methyl-6-cyclopentylphenol, 2-tert.-butyl-4-methyl-6-indenyl phenel and 2-tert.-butyl-4-methyl-6-norbornylphenol, are mentioned in particular as compounds of the formula (I).

The novel compounds of formula (I) are prepared by reacting a compound corresponding to the general formula

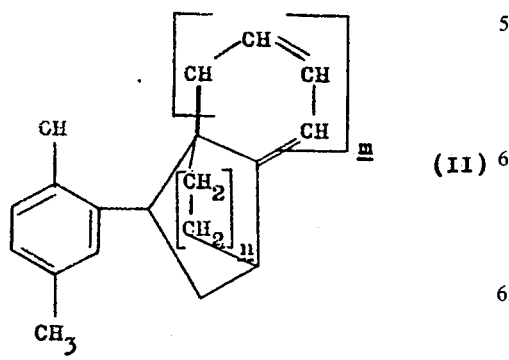

in which $m$ and $n$ are as defined above, with isobutylene at a temperature of from 20° to 250°C. and preferably from 20° to 120°C., in the presence of an acid catalyst and optionally in the presence of a diluent. In a modification of this process, the new compounds of formula (I) can also be prepared by reacting 2-tert.-butyl-4-methylphenol with norbornene, cyclopentene or indene at a temperature of from 20° to 250°C. in the presence of an acid catalyst and optionally in the presence of a diluent.

Examples of suitable acid catalysts include acids such as sulphuric acid, o-phosphoric acid, mixtures of sulphuric acid and o-phosphoric acid, polyphosphoric acid and hydrochloric acid; strongly acid solid catalysts such as aluminium silicates for example; Friedle-Crafts catalysts such as boron fluoride etherate, boron fluoride phenolate, boron fluoride acetic acid, aluminium chloride, ferric chloride, tin tetrachloride and zinc chloride or aryl and alkyl sulphonic acids, such as toluene sulphonic acid and butane sulphonic acid, also aluminium and magnesium phenelates, preferably the aluminium and magnesium salts of the phenols used.

Examples of suitable diluents include hydrocarbons such as light petrol, cleaning spirit, hexane, cyclohenane, benzene, toluene, xylene; chlorinated hydrocarbons such as methylene chloride, ethylene chloride, chloroform, carbon tetrachloride, tri- and tetrachloroethylene and chlorobenzene; ethers such as diethyl ether, diisopropyl ether, dioxane and tetrahydrofuran; ketones such as acetone, methyl ethyl ketone, diethyl ketone, methyl propyl ketone, methyl ethyl ketone, di-n-propyl ketone, methyl isopropyl ketone, cyclohexanone, also acetic acid. It is, of course, also possible to use the reaction product itself as the diluent.

Instead of isobutylene, tert. butanol or tert. butyl halide such as tert. butyl chloride or bromide can also be used for the reaction according to the invention. Similarly, cyclopentanol and cyclopentyl chloride or bromide can be used instead of cyclopentene.

The reaction is preferably carried out at a temperature of from 20° to 120°C.. The end product is obtained in pure form and in high yields by distillation. The catalyst is separated off before distillation, for example by filtration, or inactivated by neutralisation.

The invention also relates to the use of compounds of the formula (I) for protecting natural or synthetic diene polymers against degradation through oxidation. Examples of such polymers include natural rubber or synthetic rubber-like polymers obtained, for example, from conjugated diolefins such as butadiene, dimethylbutadiene, isoprene and its homologues, or copolymers of these conjugated diolefins with polymerisable vinyl compounds such as styrene, α-methyl styrene, acrylonitrile, methacrylonitrile, acrylates and methacrylates.

It is known that amine-based anti-agers such as phenyl-β-naphthyl amine or N-phenyl-N'-isopropyl-p-phenylene diamine cannot be used for light and coloured diene polymers of the aforementioned kind which should only undergo little or no discolouration in daylight, on account of their unfavourable tendency towards discolouration (cf. S. Boström, Kautschuk Handbuch, Vol. 4, Stuttgart 1961, page 373, lines 24

— 30 and page 375, lines 1 - 6); substituted phenols such as 2,6-di-tert.-butyl-4-methylphenol, for example, are used instead. This compound is a frequently used non-discolouring anti-ager and a common stabiliser for synthetic rubber and latex and is used, in particular, for the non-discolouring stabilisation of cis-1,4-polyisoprene. Unfortunately, 2,6-di-tert.butyl-4-methyl phenol has the considerable disadvantage that it is extremely volatile and only provides the rubber or the latex with inadequate protection against the aggressive influence of oxygen, especially at high temperatures (cf. S.Boström, Kautschuk Handbuch, 4th Vol., Stuttgart 1961, page 379, paragraph 5, especially lines 27 and 28). For example, considerable losses of stabiliser and obnoxious fumes have to be accepted during the working up of cis-1,4-polyisoprene. The volatility of the substituted phenols suitable for use as anti-agers or stabilisers can be reduced by introducing higher alkyl radicals into the 2- and/or 4- and/or 6-position of the phenol nucleus. Unfortunately, the protective effect is inevitably weakened because the longer alkyl radicals act as a ballast and exert a diluting effect upon the effective group, thus weakening the over all level of effectiveness (cf. S.Boström, Kautschuk Handbuch, 4th Vol., Stuttgart 1961, page 378, last paragraph to page 379, lines 1 - 13).

It has now been found that compounds corresponding to the general formula:

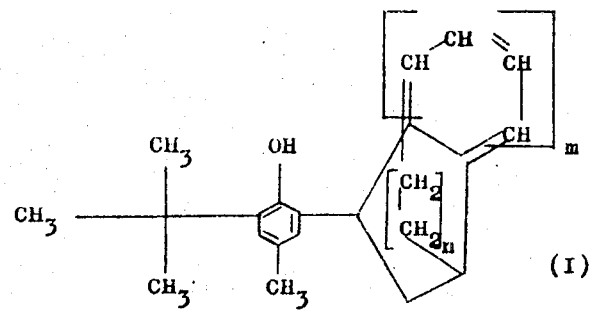

(I)

in which $m$ and $n$ are 0 or 1 but cannot at the same time both represent the number 1, can be used for protecting natural and synthetic diene polymers against degradation through oxidation.

Accordingly, the right-hand radical in formula (I) represents the cyclopentyl radical

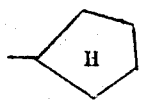

the indanyl radical

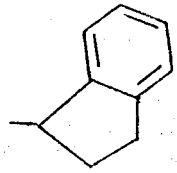

or the norbornyl radical

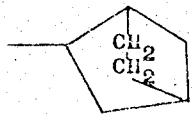

The new compounds can be used as non-discolouring anti-agers or stabilisers both for natural rubber and also for synthetic rubbers and latex such as rubber-like polymers, for example polybutadiene, polydimethyl butadiene, cis-1,4-polyisoprene and its homologues, polystyrene, poly-α-methyl styrene, polyacrylonitrile, polyacrylates, polymethacrylate, or copolymers of conjugated diolefins and polymerisable vinyl compounds such as butadiene-styrene copolymers and butadiene-acryl copolymers.

The compounds according to the invention can be added both to the latex or the rubber solution and to the crude rubber or to the crude mixture. The cresol derivative is added in a quantity of from 0.01 to 5.0 parts by weight and preferably in quantities of from 0.1 to 2.0 parts by weight based on 100.0 parts by weight of the elastomer. The new compounds of formula (I) are added to the crude rubber or to the mixture in the usual way be mixing on mixing rolls or in internal mixers, or added to the latex in the form of a dispersion or an emulsion.

It must be regarded as extremely surprising that the compounds used in accordance with the invention are considerably more effective in the protection they provide against degradation through oxidation in the aforementioned diene polymers. A considerably better stabilising effect is obtained im comparison with 2,6-di-tert.-butyl-4-methyl phenol for the same dosage. Another considerable advantage is the limited volatility of the new cresol derivatives which makes them particularly suitable for use at elevated temperatures. Thus, the volatility of 2-tert.-butyl-6-cyclopentyl-p-cresol at 100°C. under normal pressure and the steam volatility amount for example to only about 20 percent of that of 2,6-di-tert.-butyl-4-methyl phenol. As a result, obnoxious odours, disturbances and losses of stabiliser are avoided during working up. The stabilised polymers show outstanding stability in storage and a high level of stability during ageing in hot air and can be used with particular advantage for light mixtures.

In the following Examples which illustrate the invention, temperatures are expressed in °C.

EXAMPLE 1

400 g. (2.27 mols) of 2-cyclopentyl-4-methyl phenol are dissolved in 500 ml. of toluene. 5 ml. of 96 percent sulphuric acid are then added and 160 g. (2.9 mols) of isobutylene are introduced with vigorous stirring over a period of 4 hours at 70°C.. The mixture is then cooled, 30 g. of calcium oxide added, stirring continued for 30 minutes and the precipitate filtered off under suction and the filtrate concentrated in a water-jet vacuum. The oily residue is distilled in vacuo. 462 g. (88 percent of the theoretical) of 2-tert.-butyl-4-methyl-6-cyclopentyl phenol are obtained in the form of a colourless oil boiling at 134° – 136°C./1.8 mm.

| $C_{16}H_{24}O$ | (232.4) | | |
|---|---|---|---|
| Calculated: | C 82.7 | H 10.4 | O 6.9 |
| Found: | C 83.3 | H 10.5 | O 6.9 |

EXAMPLE 2

630 g. (2.8 mols) of 2-indanyl-4-methylphenol are dissolved in 1 litre of toluene. 10 ml. of 96 percent sulphuric acid are then added and 180 g. (3.2 mols) of isobutylene are introduced with vigorous stirring over a period of 2 hours at 70°C.. Stirring is continued for 3 hours at 70°C., after which the mixture is decanted off from most of the catalyst, 25 ml. of a concentrated aqueous sodium hydroxide solution are stirred in, the product dried with sodium sulphate and the solvent is distilled off in vacuo. The highly viscous residue is distilled in vacuo. 541 g. of a yellowish thickly liquid oil which gradually solidifies (b.p. 159° – 160°C./0.6 mm.) are obtained. By dissolving the crude product in and reprecipitating it from light petrol, 396 g. (51 percent of the theoretical) of 2-tert.-butyl-4-methyl-6-indanyl phenol are obtained in the form of colourless crystals melting at 85° to 86.5°C.

| $C_{20}H_{24}O$ | (280.3) | | |
|---|---|---|---|
| Calculated: | C 85.8 | H 8.5 | O 5.7 |
| Found: | C 85.0 | H 8.5 | O 6.0 |

EXAMPLE 3

430 g. (2.62 mols) of 2-tert.-butyl-4-methylphenol are dissolved in 500 ml. of toluene. 4.5 ml. of $BF_3$ etherate are added and 164 g. (1.74 mols) of norbornene are dissolved in 180 ml. of toluene added dropwise with stirring over a period of 3 hours at 60°C.. Stirring is then continued for 3 hours at 60°C., the catalyst is inactivated by the introduction of ammonia, the product is filtered following the addition of active carbon and is then distilled in a column. 303 g. (67.5 percent of the theoretical) of 2-tert.-butyl-4-methyl-6-norbornyl phenol are obtained in the form of a colourless highly viscous oil of b.p. 160° – 163°C./3.5 mm.

| $C_{18}H_{26}O$ | (258.3) | | |
|---|---|---|---|
| Calculated: | C 83.6 | H 10.2 | O 6.2 |
| Found: | C 82.3 | H 10.6 | O 6.2 |

The same product can be obtained by reacting 202 g. (1 mol) of 2-norbornyl-4-methylphenol dissolved in 250 ml. of toluene with 56 to 112 g. (1 to 2 mols) of isotubylene at 70°C. in the presence of 2–3 ml. of 96 percent sulphuric acid.

EXAMPLE 4

The following mixtures were prepared on mixing rolls:

| | Parts by weight |
|---|---|
| Light crepe | 100.0 |
| Zinc oxide | 5.0 |
| Stearic acid | 1.0 |
| Titanium dioxide | 10.0 |
| Barium sulphate, precipitated | 60.0 |
| Tetra methylthiuramdisulphide | 0.5 |
| Sulphur | 2.0 |
| Anti-ager | as in Table 1 |

The mixtures are then vulcanised in a press for 17 minutes at 130°C.. The vulcanisate obtained has the following mechanical properties (determined in accordance with DIN Specifications 53 504, 53 505 and 53 512):

TABLE 1 a) without any anti-ager present (zero value)

| | tensile strength (kp/cm²) | breaking elongation (%) | strain at 450% elongation (kp/cm²) | hardness 20°C/75°C. (Shore A) | resilience 20°C/75°C (%) |
|---|---|---|---|---|---|
| before ageing | 215 | 670 | 85 | 51/50 | 70/77 |
| Ageing in an oxygen cylinder at 21 atms. oxygen/70°C. | | | | | |
| after 6 days | | test specimen hardens | | | |
| after 11 days | | do. | | | |
| after 16 days | | do. | | | |
| Colour of the vulcanisates | | | | | |
| before exposure | | white | | | |
| after 2 months in the open air | | white | | | |
| b) with 1.0 part by weight of 2,6-di-tert.-butyl-4-methylphenol | | | | | |
| before ageing | 215 | 670 | 85 | 51/50 | 70/77 |
| ageing in an oxygen cylinder at 21 atms. oxygen/70°C. | | | | | |
| after 6 days | 135 | 520 | 82 | 50/48 | 61/65 |
| after 11 days | 55 | 460 | 52 | 46/40 | 50/55 |
| after 16 days | | test specimen hardens | | | |
| Colour of the vulcanisates | | | | | |
| before exposure | | white | | | |
| after two months in the open air | | white | | | |
| c) with 1.0 part by weight of 2-tert.-butyl-4-methyl-6-cyclopentyl phenol | | | | | |
| before ageing | 205 | 660 | 87 | 52/51 | 70/75 |
| ageing in an oxygen cylinder at 21 atms. oxygen/70°C. | | | | | |
| after 6 days | 150 | 540 | 99 | 54/52 | 69/70 |
| after 11 days | 119 | 520 | 85 | 50/49 | 58/66 |
| after 16 days | 50 | 350 | — | 47/44 | 52/60 |
| Colour of the vulcanisates | | | | | |
| before exposure | | white | | | |
| after 2 months in the open air | | white | | | |

EXAMPLE 5

The mixture was the same as that described in Example 4. Vulcansiation was carried out in a press for 15 minutes at 130°C.

Stopping, stabilising and working-up.

4.4 g. of anhydrous ethylene diamine dissolved in 500 ml. of hexane are added to the polymer solution in the absence of oxygen, followed by careful mixing. The stopped polyisoprene solution is then washed with

TABLE 2 a) With 1.0 part by weight of 2-tert.-butyl-4-methyl-6-indanyl phenol

| | tensile strength (kp/cm²) | breaking elong- ation (%) | strain at 450% elong- ation (kp/cm²) | hardness 20°C/75°C (Shore A) | resil- ience 20°C/75°C (%) |
|---|---|---|---|---|---|
| before ageing | 205 | 680 | 74 | 50/50 | 71/75 |
| ageing in an oxygen cylinder at 21 atms. O₂/60°C. | | | | | |
| after 6 days | 175 | 590 | 92 | 55/53 | 70/73 |
| after 11 days | 155 | 550 | 96 | 53/53 | 69/70 |
| after 16 days | 150 | 550 | 93 | 52/52 | 68/69 |
| Colour of the vulcanisates | | | | | |
| before exposure | | white | | | |
| after 2 months in the open air | | white | | | | b) With 1.0 part by weight of 2-tert.-butyl-4-methyl-6-norbonyl phenol

| | | | | | |
|---|---|---|---|---|---|
| before ageing | 215 | 690 | 75 | 50/50 | 71/72 |
| ageing in an oxygen cylinder at 21 atms. O₂/60°C. | | | | | |
| after 6 days | 180 | 580 | 95 | 55/54 | 70/73 |
| after 11 days | 155 | 540 | 101 | 55/53 | 70/72 |
| after 16 days | 160 | 560 | 97 | 52/52 | 68/70 |
| Colour of the vulcanisates | | | | | |
| before exposure | | white | | | |
| after 2 months in the open air | | white | | | |

EXAMPLE 6

The polymerisation, working-up and stabilisation of cis-1,4-polyisoprene. a. Preparation of the catalyst.

34 Ml. of n-hexane are introduced under a nitrogen atmosphere into a dry vessel equipped with a stirring mechanism. A solution of 0.626 g. = 33 mMols of $TiCl_4$ in 67 ml. of n-hexane, a solution of 0.339 g. = 29.7 mMols of $Al(C_2H_5)_3$ and 0.154 g. of di-n-butyl ether in 67 ml. of n-hexane are then uniformly introduced with stirring at 0°C. The brown catalyst suspension formed is stirred for 30 minutes at 0°C.. b. Polymerisation.

30 litres of dry hexane and 2,200 g. of isoprene are introduced into a dry autoclave equipped with a stirring mechanism. The contents of the autoclave are then cooled to 8°C. under a nitrogen atmosphere. The catalyst suspension is added at this temperature. Polymerisation begins immediately without any latent period. The heat of polymerisation is dissipated through external cooling so that the polymerisation temperature slowly rises to 12°C. over a period of 3 hours when the conversion amounts to between 90 and 100 percent. c.

twice the volume of water. After the water has been separated off, 16 g. of 2-di-tert.-butyl-6-cyclopentyl-p-cresol (0.8 percent, based on polyisoprene), dissolved in 500 ml. of hexane, are added, followed by thorough mixing.

This stabiliser-containing polymer solution is freed from solvent by introducing it into hot water. The polyisoprene particles are dried in vacuo at 50°C.

For comparison, 20 g. of 2,6-di-tert.-butyl-4-methyl phenol are used for stabilisation in a second test under otherwise the same conditions.

TABLE 3

Hot-air ageing at 70°C:

| Stabiliser | quantity (%) | Mooney value (according to DIN 53524) after days | | | colour after 14 days at 70°C. |
|---|---|---|---|---|---|
| | | 0 | 3 | 7 | 14 |

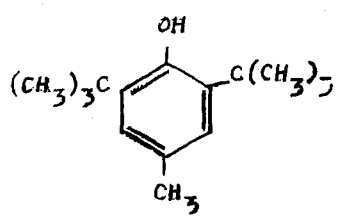

|   |   |   |   |   |   |
|---|---|---|---|---|---|
| 1.0 | 90 | 90 | 86 | 26 | yellowish colourless |

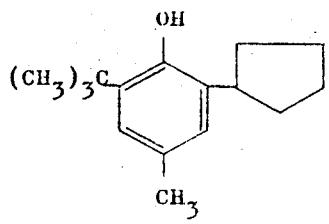

|   |   |   |   |   |   |
|---|---|---|---|---|---|
| 0.8 | 91 | 90 | 90 | 60 | yellowish- colourless |

EXAMPLE 7

The following mixture was used for a test conducted on an unstabilised carboxylated SBR latex foam:

| | | |
|---|---|---|
| carboxylated SBR latex | 172.0* | parts by weight |
| fatty alcohol sulphonate | 4.5 | do. |
| zinc oxide | 5.0 | do. |
| melamine resin precondensate (50% aqueous solution) | 5.0 | do. |
| carboxymethyl cellulose (2.5% aqueous solution) | 5.0 | do. |
| chalk | 100.0 | do. |
| stabilisers | | cf. Table 4 (quantities based on 100.0 parts by weight of dry substance) |

* = 100.0 parts by weight of the solid rubber

The mixture was expanded into a foam with a weight per litre (wet) of approximately 350 g.. The foam was coated in a layer thickness of 4 mm. on to a thin white textile and vulcanised in hot air for 15 minutes at 140°C. and then dried. The test specimen measured 20 × 20 × 4 mm.

TABLE 4

| | no stabiliser present | 2,6-di-tert. butyl-4-methyl phenol | 2-tert.-butyl-4-methyl-6-cyclopentyl phenol | 2-tert.-butyl-4-methyl-6-indanyl-phenol | 2-tert.-butyl-4-methyl-6-norbornyl phenol |
|---|---|---|---|---|---|
| a) Hardening of the test specimen after storage in hot air at 100°C after—days | 8 | 8 | 40 | 35 | 28 |
| b) the test specimen turns brown after storage in hot air at 190°C after — minutes | 1 | 1.5 | 6 | 8 | 3.5 |
| c) the test specimen ignites after storage in hot air at 190°C for — minutes | 2 | 2 | >30 | >30 | 5.5 |
| d) the test specimen hardens after storage at 70°C/21 atms. oxygen for — days | 40 | 45 | >50 | >50 | >50 |
| e) the test specimen hardens after storage under an ultra-violet lamp for — days | 3 | 3 | >6 | >6 | >6 |
| f) the test specimen discolours after storage under an ultra-violet lamp for — days | 2 | 2 | 3 (very pale yellow) | 3 | 3 |

What is claimed is:

1. A method for protecting natural and synthetic diene polymers against degradation through oxidation which comprises incorporating 0.01 to 5 parts by weight of a compound of the formula

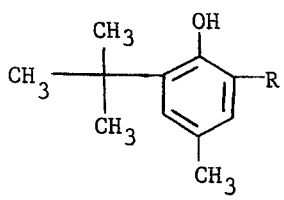

wherein R is

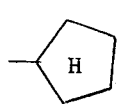 or 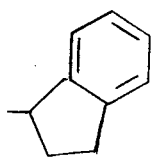

2. The process of claim 1 wherein R is

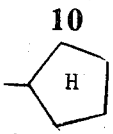

3. The process of claim 1 wherein R is

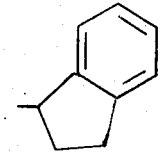

4. A composition comprising a natural or synthetic diene polymer having incorporated therein for each 100 parts by weight of said polymer 0.01 to 5 parts by weight of a compound of the formula

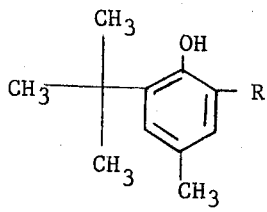

wherein R is

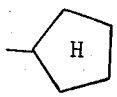 or 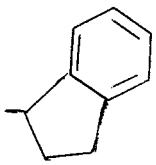

5. The composition of claim 4 wherein R is

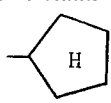

6. The composition of claim 4 wherein R is

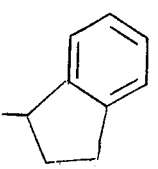

* * * * *